United States Patent
Karaoguz et al.

(10) Patent No.: US 8,189,561 B2
(45) Date of Patent: May 29, 2012

(54) METHOD AND SYSTEM FOR POWER-LIMITED SWITCHING AND/OR ROUTING IN A NETWORK

(75) Inventors: Jeyhan Karaoguz, Irvine, CA (US); Bruce Currivan, Dove Canyon, CA (US); Wael William Diab, San Francisco, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

(*) Notice: Subject to any disclaimer, the term of this patent is extended or adjusted under 35 U.S.C. 154(b) by 294 days.

(21) Appl. No.: 12/634,211

(22) Filed: Dec. 9, 2009

(65) Prior Publication Data

US 2011/0019560 A1    Jan. 27, 2011

Related U.S. Application Data (60) Provisional application No. 61/228,432, filed on Jul. 24, 2009.

(51) Int. Cl.
*H04L 12/28* (2006.01)
(52) U.S. Cl. ........................ 370/351; 370/252
(58) Field of Classification Search ............... 370/351, 370/252, 253
See application file for complete search history.

(56) References Cited

U.S. PATENT DOCUMENTS

| 7,529,561 B2 * | 5/2009 | Heinonen et al. ......... 455/552.1 |
| 2006/0034252 A1 | 2/2006 | Karaoguz |
| 2007/0281685 A1 * | 12/2007 | Pan et al. .................. 455/432.2 |
| 2010/0220653 A1 * | 9/2010 | Hwang et al. ............... 370/328 |

FOREIGN PATENT DOCUMENTS

EP    1560370 A1    8/2005

OTHER PUBLICATIONS

European Patent Office, Communication with European Search Report, in Application No. 10007402.0, dated Dec. 6, 2010.
Zhihao Guo et al., "Energy Aware Proactive MANET Routing With Prediction on Energy Consumption", Wireless Algorithms, Systems and Applications, 2007. WASA 2007, International Conference on, IEEE, Piscataway, NJ, USA, Aug. 1, 2007, pp. 287-293, XP031334870, ISBN: 978-0-7695-2981-3, Chapter 3.

* cited by examiner

*Primary Examiner* — Gary Mui
(74) *Attorney, Agent, or Firm* — Brinks Hofer Gilson & Lione (57) ABSTRACT

Communication devices may determine routes and/or may select a route for communicating data between a first communication device and a second communication device. The selected route may require the least power consumption. The determined routes may be ranked based on an amount of power required for routing the data. The data may be routed among devices based on the ranking. Power consumption of a device may be determined based on a bandwidth associated with the device. Route selection may be based on availability of power for power sources of the communication devices. The selection of routes may be based on a current power consumption and/or a history of prior power consumption of the communication devices. The selection of a route which may require least power consumption may be optimized based on the availability of bandwidth.

17 Claims, 4 Drawing Sheets

METHOD AND SYSTEM FOR POWER-LIMITED SWITCHING AND/OR ROUTING IN A NETWORK

CROSS-REFERENCE TO RELATED APPLICATIONS/INCORPORATION BY REFERENCE

This application makes reference to, claims priority to, and claims the benefit of U.S. Provisional Application Ser. No. 61/228,432, filed on Jul. 24, 2009.

This application also makes reference to U.S. patent application Ser. No. 12/571,165 filed on Sep. 30, 2009 which is hereby incorporated herein by reference in its entirety.

This application also makes reference to U.S. patent application Ser. No. 12/581,741 filed on Oct. 19, 2009 which is hereby incorporated herein by reference in its entirety.

FIELD OF THE INVENTION

Certain embodiments of the invention relate to communication systems. More specifically, certain embodiments of the invention relate to power limited switching and/or routing in a network.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, personal computers (PCs) including laptops and other specialized devices including, for example, printers, audiovisual devices and other devices, are connected together as nodes in computer networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based network and utilizes various protocols comprising TCP/IP, for example, to facilitate packet switching. In this regard, data is encapsulated into packets that comprise a header portion and a payload portion to enable transporting, addressing and/or routing among various entities within or coupled to the network.

Network switching devices, comprising such devices as switches, routers and/or hubs, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Switches also comprise multiple ports, but unlike hubs, switches are more actively functional in performing routing operations. For example, switches maintain routing information that enable the switches to examine received packets and process them accordingly to determine whether the packets are transmitted via the switch, and if so, to determine the appropriate ports to perform that transmission. Switches may store, generate, and/or maintain addressing related information of accessible network nodes.

Some network switches, however, may block traffic. Blocking occurs when a switch reaches a point where it is unable to perform additional switching even though it has not reached its theoretical maximum throughput, which generally is based on the combined maximum speeds of all of its ports.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for power limited switching and/or routing in a network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for power limited switching and/or routing in a network. In various embodiments of the invention, one or more communication devices of a plurality of communication devices may comprise one or more processors and/or circuits that may be operable to determine a plurality of routes over which data may be communicated between a first communication device of the plurality of communication devices and a second communication device of the plurality of communication devices. In accordance with an embodiment of the invention, the plurality of routes may be determined based on availability of bandwidth for the one or more of the plurality of communication devices. In this regard, one or more of the plurality of communication devices may be a network node. Furthermore, one or more of the communication devices may be operable to select from the determined plurality of routes, one or more routes which may require least power consumption for communicating the data between the first communication device and the second communication device. Moreover, data may be communicated between the first communication device and the second communication device via the selected one or more routes. The determined plurality of routes may be ranked based on an amount of power that is required for routing the data via each of the plurality of routes. Data may be routed among the one or more of the plurality communication devices based on the ranking.

The power consumption may be determined based on a bandwidth associated with the one or more of the plurality communication devices. In an exemplary embodiment of the invention, the route selection may be based on an indication of availability of power for a power source of the one or more of the plurality communication devices. In this regard, the indication of the availability of power for the power source of the one or more of the plurality communication devices may be communicated among the plurality of communication devices. Moreover, the selection of the one or more routes may be based on a current power consumption and/or a history of prior power consumption of the one or more of the plurality communication devices. The selection of the one or more routes which requires least power consumption may be optimized based on the availability of bandwidth.

Figure 1:
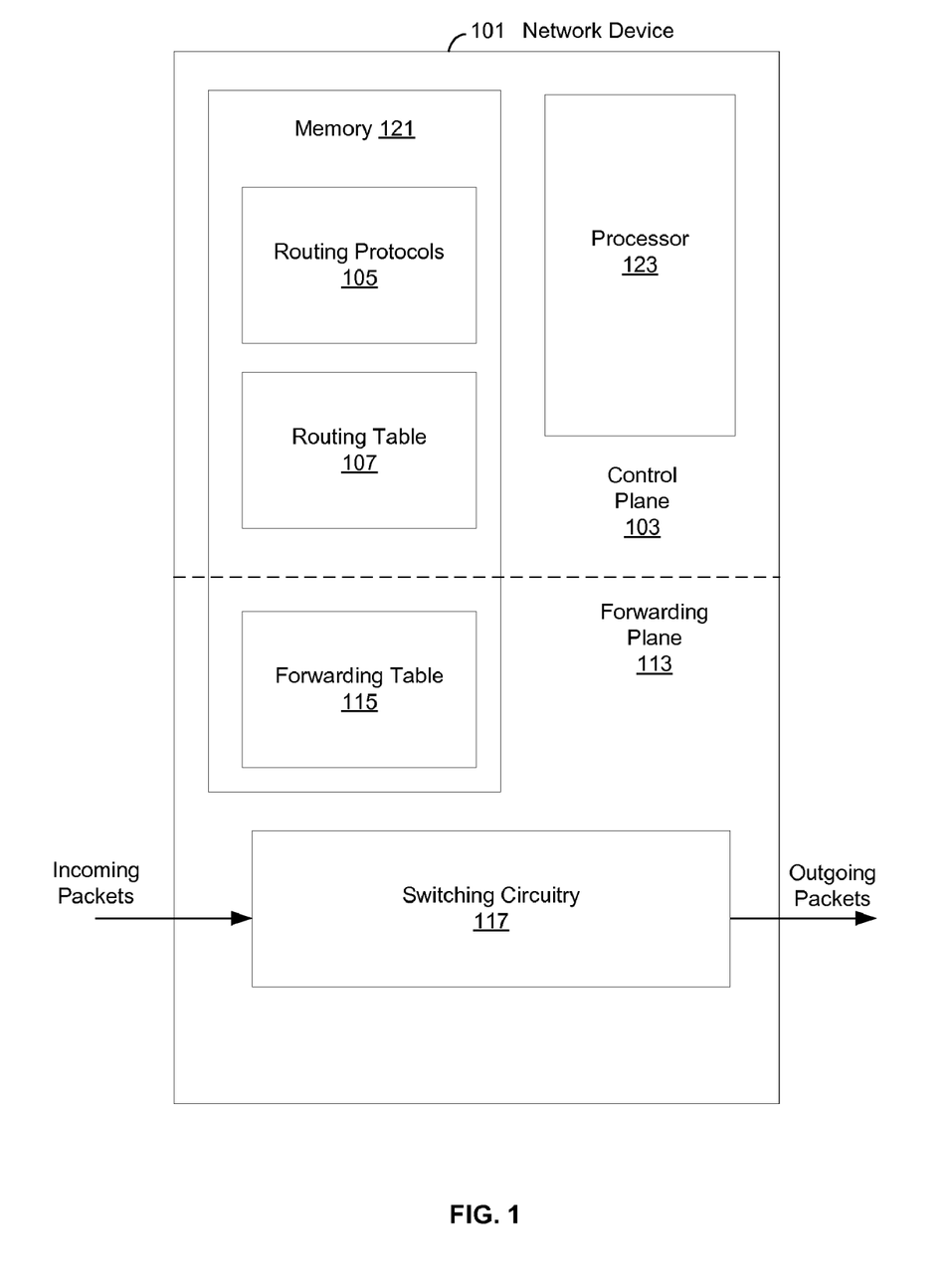
FIG. 1 is a block diagram that illustrates an exemplary routing device, in accordance with an embodiment of the invention.

FIG. 1 is a block diagram that illustrates an exemplary routing device, in accordance with an embodiment of the invention. Referring to FIG. 1, there is shown a network device 101, a processor 123, a memory 121, a control plane 103, routing protocols 105, a routing table 107, a forwarding plane 113, a forwarding table 115 and a switching circuitry 117.

The network device 101 comprises suitable logic, circuitry, interfaces and/or code that may be operable to determine where to route packets and to forward network traffic received from one network node and/or sub-network to another network node and/or sub-network. Routing operations may be performed based on one or more networking layers, for example, based on the Open Systems Interconnection (OSI) Model. The network routing devices 101 may be operable to perform L2, L3 and/or L4 operations. Furthermore, the network 101 may be operable to utilize power consumption information about other network routing devices when determining where to route packets. The network 101 may be implemented on a single chip, using a chipset, on a single device and/or a plurality of devices, for example.

The control plane 103 may comprises suitable logic, circuitry, interfaces and/or code that may be operable to determine how the network routing device 101 will handle packets that are received and forwarded via the forwarding plane 113. The control plane 103 may be operable to determine that a packet may be discarded or that a packet may receive a specified quality of service. The control plane 103 comprises routing protocols 105 that may specify how the network device 101 communicates with other network devices and/or how routes are selected, for example. In addition, the routing protocol 105 may determine how a routing table is constructed. Exemplary routing protocols 105 comprise interior gateway routing protocol (IGRP), open shortest path first (OSPF), routing information protocol (RIP) and intermediate system to intermediate system (IS-IS). The control plane 103 also comprises the routing table 107 that may comprise routes to particular network destinations.

The forwarding plane 113 may comprise suitable logic, circuitry, interfaces and/or code that may be operable to accept a packet arriving on an incoming link, look up a destination address for the incoming packet and determine an internal path through the switching circuitry 105 that will direct the packet outward via a proper outgoing link. The forwarding plane may be operable to encapsulate outgoing packets and set various packet fields. For example, the forwarding plane may modify a field for quality of service or may decrement a time-to-live field in the packet and may discard the packet if the time-to-live equals zero. The forwarding plane may update a check sum.

The switching circuitry 117 may comprise suitable logic, circuitry, interfaces and/or code that may be operable to direct packets received from an incoming link to one or more outgoing links. The switching circuitry 117 may comprise, for example, input queuing and output queuing. In addition, the switching circuitry 117 may comprise a subsystem which may comprise suitable logic, circuitry, interfaces, and/or code that may enable exchange of data and/or messaging via a plurality of physical interconnects.

The memory 121 may comprise suitable logic, circuitry, interfaces and/or code that may be operable to store instructions and/or parameters that enable functionality described with respect to the control plane 103 and/or the forwarding plane 113. For example, the memory 121 may be operable to store data that may characterize other network nodes with regard to power consumption and/or bandwidth availability. The memory 121 may be operable to store packet data that may be received and/or forwarded by the network 101. In addition, the memory 121 may be operable to store power consumption criteria and/or bandwidth criteria for routing the stored packet data. Moreover, the memory 121 may store the routing table 107. The routing table 107 may comprise routing information that may be sent to the forwarding table 115 in the forwarding plane 113. The routing information may comprise preferred routes chosen by a routing algorithm for forwarding packets. The memory 121 may be communicatively coupled to the processor 123 and/or the switching circuitry 117.

The processor 123 may comprise suitable logic, circuitry, interfaces and/or code that may be operable to execute instructions and/or utilize parameters that may enable functionality described with respect to the control plane 103 and/or the forwarding plane 113. The processor 123 may manage the communication of packets based on the routing protocols 105. In addition, the processor 123 may receive information from other routers and/or other network devices and may utilize the received information to construct the routing table 115. The processor 123 may be operable to receive and/or utilize information regarding power consumption of one or more network nodes when making routing decisions. For example, the information regarding power consumption may comprise how much power a network node would consume for communicating data at a specified bandwidth. For example, a specified number of Watts and/or Joules utilized for a specified number of transmitted bits per second may be specified. In another exemplary embodiment of the invention, the information regarding power consumption may comprise a current level of power usage by a network node, for example, indicating a level of power consumption at a certain time.

The processor 123 may also be operable to determine criteria for power consumption and/or bandwidth needed for communicating specified data that may be pending transmission. For example, a power per bandwidth criteria may comprise a specified number of Watts and/or Joules utilized for a specified number of transmitted bits per second. In this regard, information within a packet header, for example, a tag and/or a parameter, may indicate power consumption criteria and/or other criteria for communicating the packet. The processor 123 may be operable to consider trade-offs between bandwidth and power consumption to determine a best route for the data pending delivery. In this manner, a communication path through a network may be determined based on power consumption criteria of data pending transmission and/or power consumption characteristics of network nodes along the communication path. The tradeoff may be determined based on, for example, a type of data being transmitted, a particular class and/or type of service being provided, and/or based on user preference. The processor 123 may be communicatively coupled to the memory 121 and/or the switching circuitry 117.

In operation, the network device 101 may be utilized to perform network operations. The network device 101 may be utilized, for example, in a local area network (LAN), to enable transfer of traffic packets between network nodes in the LAN. For example, where received traffic packets are TCP/IP traffic packets, the IP headers may be parsed to determine the source and/or destination addressing information for the received traffic packets. Once the destination nodes are determined, based on routing tables maintained in the memory 121 for example, the packets may be transmitted via the forwarding plane 113.

The network device 101 may be operable, for example, to maintain routing information that may enable mapping of a set of destination addresses corresponding to various network nodes, to a plurality of outgoing links in the network device 101. The routing information may be stored, generated, and/or maintained by the processor 123 of the network device 101, for example. Once the appropriate outgoing links are determined for a received packet, the switching circuitry 117 may be utilized to transfer the packet to the appropriate outgoing links.

In some network devices, for example, hardware, software and/or logic limitations in the network device 101 may result in 'blocking.' Blocking occurs when a reaches a point where it is unable to perform additional switching even though it has not yet reached its theoretical maximum throughput, which generally is based on the aggregate maximum speeds of all of its ports.

In various embodiments of the invention, the processor 123 may be operable to receive information about one or more other network devices that may be candidates for handling packets that are being routed through a network. The information may comprise power consumption and/or power consumption per specified bandwidth by the one or more network devices. For example, information may comprise Watts per bits-per-second and/or Joules per bit that may be utilized for communicating packets via the network device. In this regard, the processor 123 may be operable to make routing decisions based on the power consumption information and/or power consumption per bandwidth utilized information. For example, a route may be chosen for delivery of packet data based on how much power may be utilized to handle the packet data rather than based on a minimum number of hops, for example. In various embodiments of the invention, a routing device may comprise server functionality that may utilize the power consumption information to make routing decisions independent of input from a routing server and/or central management entity.

In an exemplary aspect of the invention, the network device 101 may be operable to communicate information regarding its own power consumption and/or bandwidth information to one or more neighboring network devices. In addition, the network device 101 may be operable to receive similar information from one or more of its neighboring communication devices and may make decisions about where to route the various types of traffic based on that information.

In an exemplary embodiment of the invention, the network device 101 may be operable to send IP telephony packets to a specified destination via a plurality of routes wherein two or more of the routes comprise a different number of hops to reach the specified destination. In instances when the network device 101 has information regarding power consumption of the network devices along the two or more routes, the network device 101 may choose a route with the lowest power consumption rather than a route that may comprise fewer hops but would result in consumption of more power.

Figure 2:
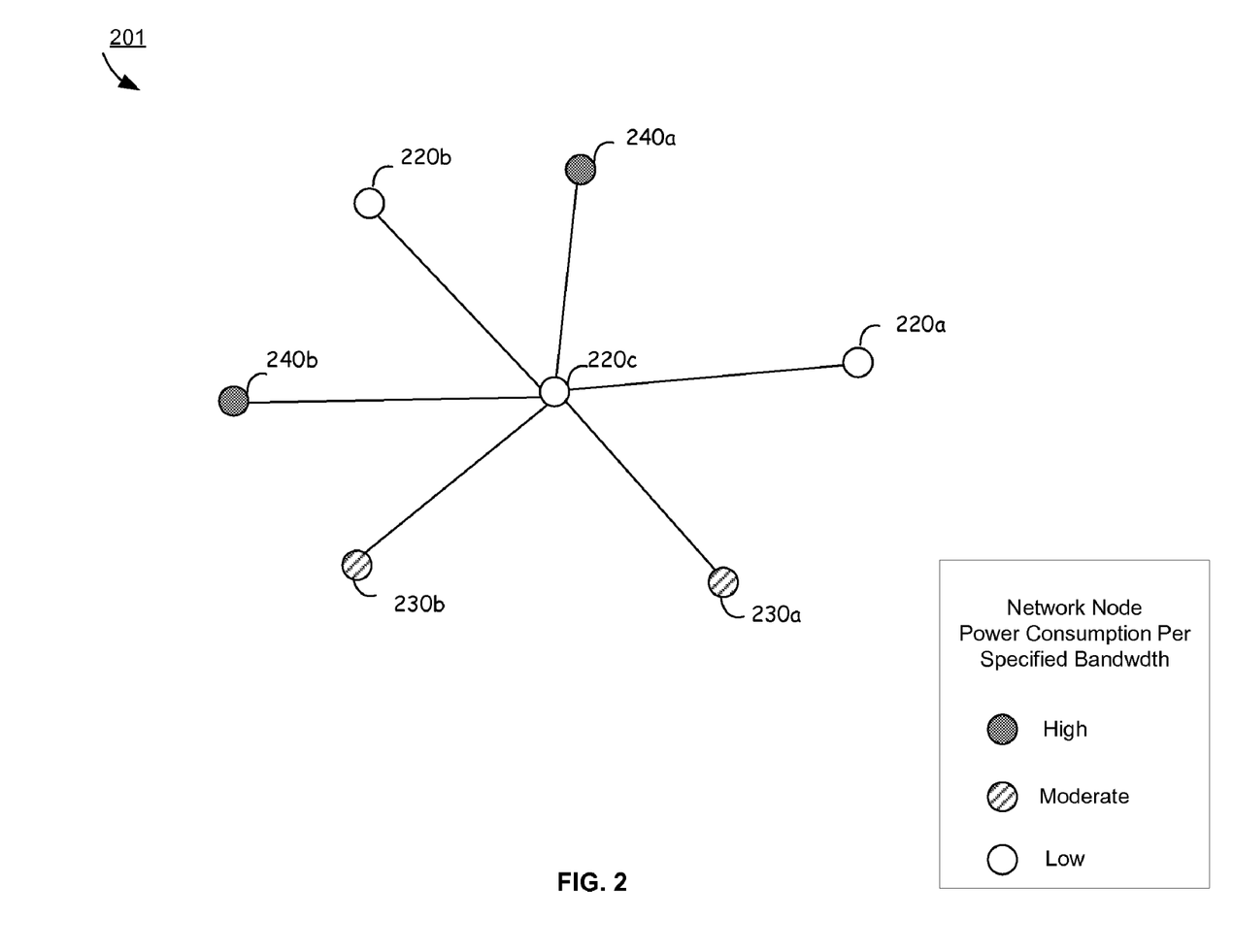
FIG. 2 is a block diagram illustrating an exemplary plurality of network nodes that are enabled to make routing decisions based on a how much power may be utilized when communicating via various communication paths, in accordance with an embodiment of the invention.

FIG. 2 is a block diagram illustrating an exemplary plurality of network nodes that are enabled to make routing decisions based on a how much power may be utilized when communicating via various communication paths, in accordance with an embodiment of the invention. Referring to FIG. 2, there is shown a network 201, three low power consumption network nodes 220a, 220b and 220c, two moderate power consumption nodes 230a and 230b and two high power consumption network nodes 240a and 240b.

The network nodes 220a, 220b, 220c, 230a, 230b, 240a and/or 240b may be network devices that may be similar and/or may be substantially the same as the network device 101 described with respect to FIG. 1.

The network 201 comprises a plurality of network nodes 220a, 220b, 220c, 230a, 230b, 240a and/or 240b that may comprise, for example, routers, bridges, switches, gateway, firewalls, access points and/or endpoint devices, such as a laptop, a computer server and/or a handheld device. The network nodes may be compliant with 802.11 standards and/or variants thereof. Moreover, the network nodes 220a, 220b, 220c, 230a, 230b, 240a and/or 240b may be operable to make routing decisions based on power consumption of one or more links and/or nodes that may be considered for receiving routed data.

The network node 220c may comprise suitable logic, circuitry, interfaces and/or code that enable routing and/or forwarding of packets to other routers, switches and/or access points, for example, the network nodes 220a, 220b, 230a, 230b, 240a and/or 240b. In this regard, the network node 220c may be operable to compare power consumption for a specified bandwidth, for example, of the network nodes 220a 220b, 230a, 230b, 240a and/or 240b. Moreover, in instances when the network node 220c comprises information regarding power consumption characteristics of additional network nodes (described with respect to FIG. 3), the network node 220c may determine a communication path via a plurality of network nodes that may utilize low(er) power consumption. In various embodiments of the invention, the network node 220c may utilize other criteria when making routing decisions and/or may consider tradeoffs between minimizing power consumption and optimizing other performance metrics. For example, the network node 220c may consider bandwidth and/or latency requirements of data that may be pending delivery and/or power consumption requirements. In addition, the network node 220c may make routing decisions that may avoid dropping packets or incurring high BER, for example.

In various embodiments of the invention, the network nodes 220a 220b, 230a, 230b, 240a and/or 240b may be similar and/or substantially the same as the network node 220c however, the invention is not so limited. For example, network nodes that may be candidates for routing destinations may or may not be characterized with respect to power consumption. Moreover, one or more of the network nodes 220a 220b, 230a, 230b, 240a and 240b may or may not be operable to utilize routing algorithms and/or protocols that are sensitive to power consumption information of neighboring nodes.

In operation, ones of the network nodes 220a, 220b, 220c, 230a, 230b, 240a and/or 240b may be characterized and/or rated with respect to how much power and/or energy they consume when processing and/or routing data through the network 201. For example, the network nodes 220a, 220b, 220c, 230a, 230b, 240a and/or 240b may be characterized and/or rated for how much power is consumed when transmitting at a specified bandwidth. Referring to FIG. 2, the un-shaded network nodes 220a, 220b and/or 220c may be rated as consuming low power for a specified bandwidth. The network nodes 230a and/or 230b illustrated with parallel hatch lines may be rated as consuming moderate power for the specified bandwidth. Furthermore, the network nodes 240a and 240b illustrated with cross hatched lines, may be rated as consuming the greatest power for the specified bandwidth. In accordance with an exemplary embodiment of the invention, the network nodes 240a and/or 204b may consume twice the power of the network nodes 220a and/or 220b for the specified bandwidth. The network nodes 230a and/or 203b may consume one and a half times the power of the network nodes 220a and/or 220b for the specified bandwidth, for example. In this regard, the network node 220c may choose a route for data that may be pending delivery based on power consumption ratings and/or characterization of the routing candidate network nodes 220a, 220b, 230a, 230b, 240a and/or 240b. For example, a network device may be rated based on Watts per bits-per-second and/or Joules per bit.

Figure 3:
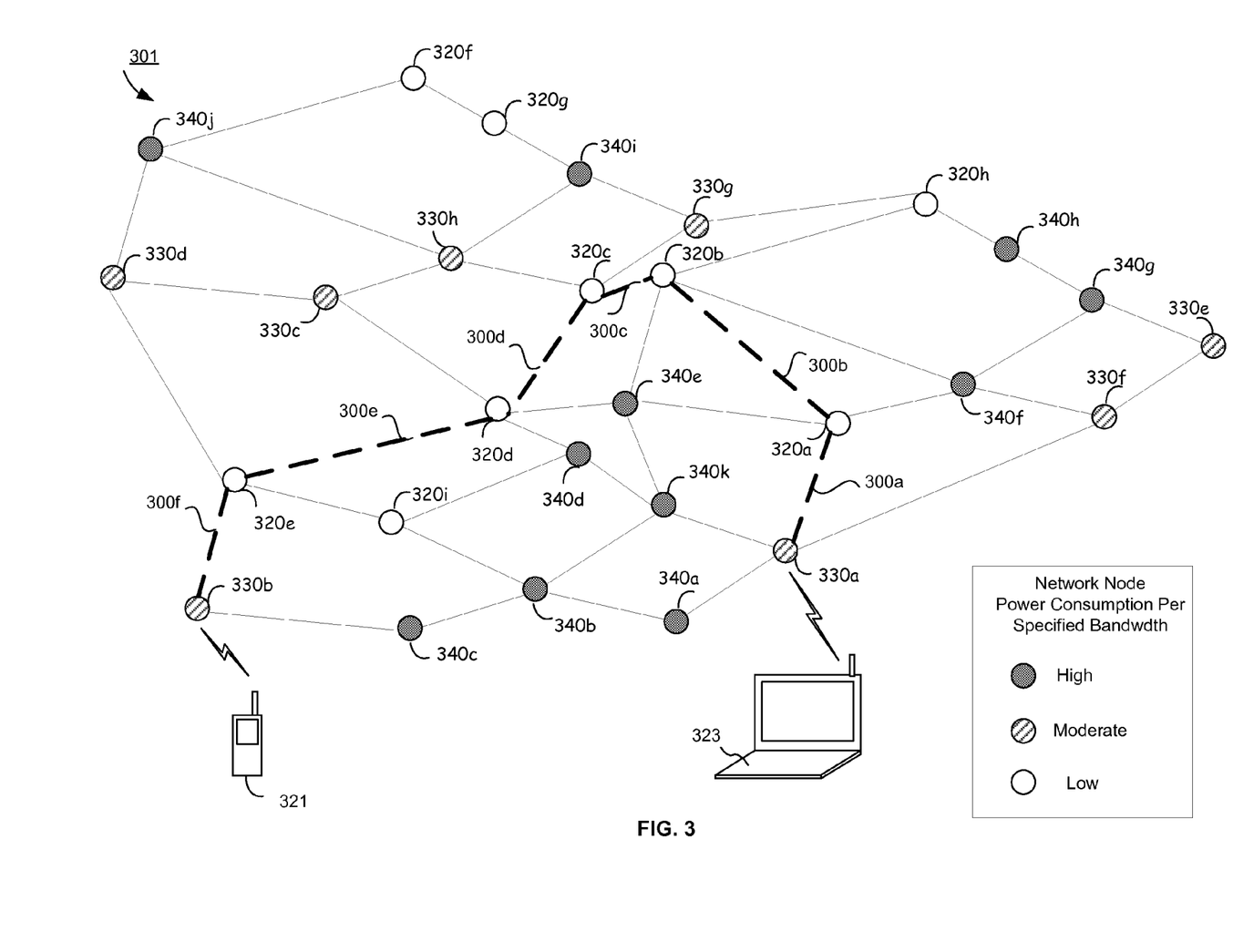
FIG. 3 is a block diagram illustrating an exemplary data delivery route via a plurality of network nodes that may be determined based on power consumption characteristics of one or more network nodes, in accordance with an embodiment of the invention.

FIG. 3 is a block diagram illustrating an exemplary data delivery route via a plurality of network nodes that may be determined based on power consumption characteristics of one or more network nodes, in accordance with an embodiment of the invention. Referring to FIG. 3, there is shown a network 301 that may comprise a handheld wireless device 321, a laptop 223, low power consumption network nodes 320a, 320b, . . . , 320i, moderate power consumption network nodes 330a, 330b, . . . , 330g and high power consumption nodes 340a, 340b, . . . , 340k. In addition, there is shown a lowest power consumption route comprising links 300a, 300b, 300c, 300d, 3003 and 330f.

In an exemplary embodiment of the invention, the network nodes 320a, 320b, . . . , 320i, 330a, 330b, . . . , 330g and/or 340b, . . . , 340k may be network devices, for example, the network nodes may be similar or substantially the same as the network device 101. Furthermore, the low power consumption network nodes 320a, 320b, . . . , 320i may be similar and/or substantially the same as the network nodes 220a, 220b and/or 220c described with respect to FIG. 2. The moderate power consumption network nodes 330a, 330b, . . . , 330g may be similar and/or substantially the same as the network nodes 230a and/or 230b. The high power consumption nodes 340a, 340b, . . . , 340k may be similar and/or substantially the same as the network nodes 240a and/or 240b. Moreover, one or more of the network nodes 320a, 320b, . . . , 320i, 330a, 330b, . . . , 330g and 340a, 340b, . . . , 340k may be similar and/or may be substantially the same as the network device 101 described with respect to FIG. 1.

The network 301 may comprise a plurality of network nodes 320a, 320b, . . . , 320i, 330a, 330b, . . . , 330g and 340a, 340b, . . . , 340k that may comprise routers, switches, access points and/or endpoint devices, for example. In various embodiments of the invention, the plurality of network nodes may comply with 802.11 standards and/or variants thereof. Moreover, the network nodes 320a, 320b, . . . , 320i, 330a, 330b, . . . , 330g and 340a, 340b, . . . , 340k may comprise suitable logic, circuitry, interfaces and/or code that may be operable to enable endpoint devices to communicate via the network 301. For example, the handheld wireless device 221 and the laptop 223 may communicate via the network 301.

In operation, the laptop 223 and the handheld wireless device 221 may exchange packet data via the network 301. In this regard, network nodes 330a and/or 330b may comprise wireless and/or wire-line access points, for example, that may be operable to route data traffic via other nodes within the network 301. The network nodes in the network 301 may comprise suitable logic circuitry and/or code to determine one or more routes for communicating data between the laptop 223 and the handheld wireless device 221 based on power consumption characteristics of the nodes within the network 301. In addition the routing decisions may be based on various criteria for communication of the data that is being communicated. For example, the data may require a specified bandwidth for good quality performance and/or user experience. In this regard, the network nodes within the network 301 may be operable to base routing decisions on a plurality of factors, for example, a trade-off between low power consumption and high bandwidth.

Referring to FIG. 3, there is shown the path comprising links 300a, 300b, 300c, 300d, 3003 and 300f that may provide a lowest power consumption path for a specified bandwidth between the laptop 223 and the handheld wireless device 221. In an exemplary embodiment of the invention the high power consumption network nodes 340a, 340b, . . . , 340k may utilize twice the power of the low power network nodes 320a, 320b, . . . , 320i. The moderate power consumption network nodes 330a, 330b, . . . , 330g may utilize one and a half times the power per specified bandwidth of the low power consumption nodes. The path comprising the links 300a, 300b, 300c, 300d, 3003 and 300f may comprise a greater number of hops than a plurality of alternative routes between the laptop 223 and the handheld wireless device 221; however, it may be chosen because it may provide the lowest power consumption and/or may meet other criteria for delivering the data. In various embodiment of the invention, a plurality of network nodes that may be specified within a zone for example may be characterized a zone with a specified power consumption rating and/or characterization. For example, the network nodes 340a, 340b, 340c, 340d and 340k may be defined as a zone of high power consumption and may be avoided by network devices that are determining routes for communicating information.

One or more network nodes within the network 301 may be characterized according to one or more of current levels of power usage, a history of power usage and/or availability of power for a power source of one or more of the network nodes. In accordance with an exemplary embodiment of the invention, one or more network nodes and/or zones of network nodes may currently be consuming high levels of power. In instances when power consumption is above a specified level in one or more network nodes and/or zones of network nodes, one or more network devices may select routes for data pending delivery via the network 301 to avoid the network nodes and/or zones of network nodes that are presently consuming power above the specified level.

Figure 4:
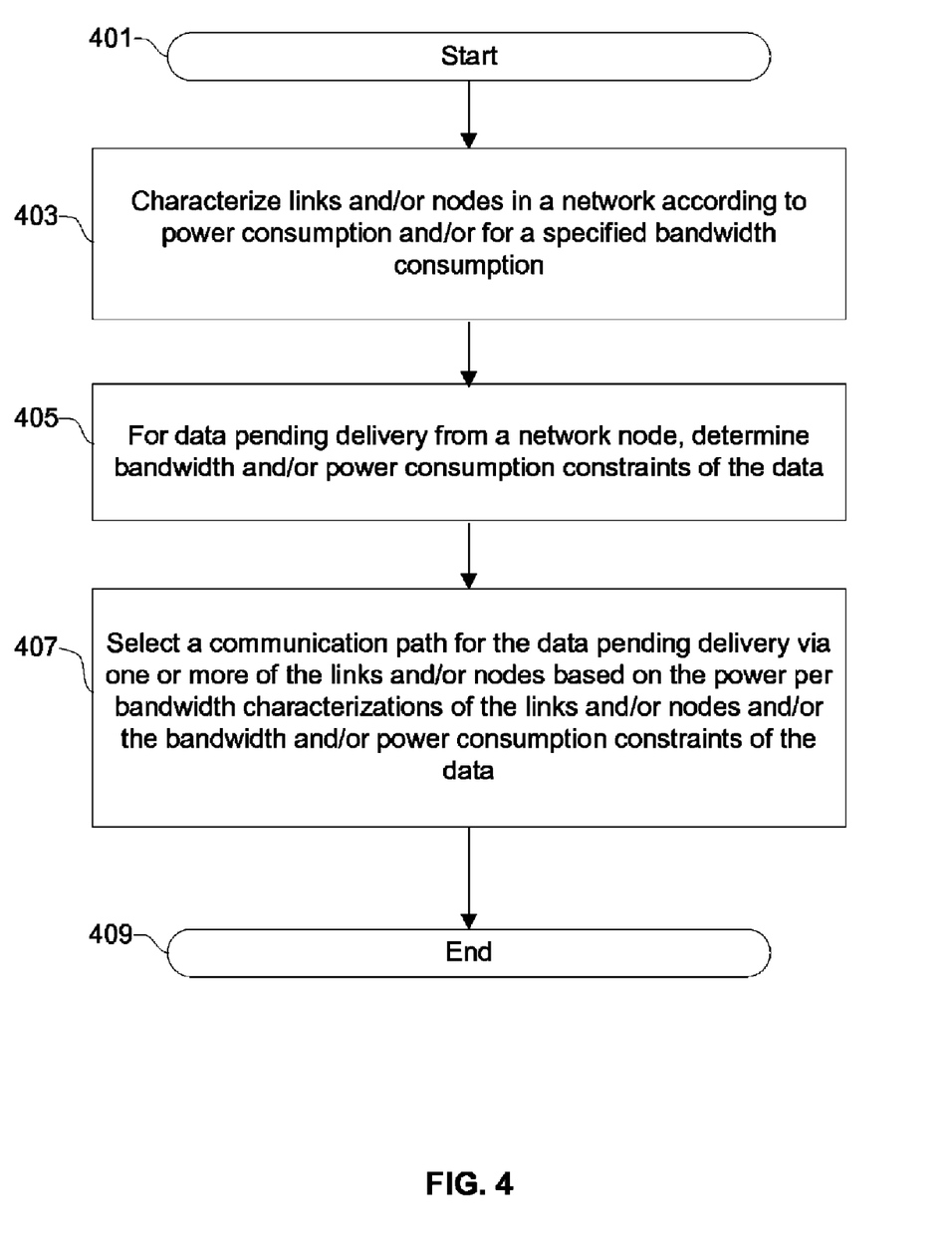
FIG. 4 is a flow chart illustrating exemplary steps for power limited routing and/or switching in a network, in accordance with an embodiment of the invention.

FIG. 4 is a flow chart illustrating exemplary steps for power limited routing and/or switching in a network, in accordance with an embodiment of the invention. In step 401, is a start step. In step 403, links and/or nodes in a network may be characterized according to power consumption and/or for a specified bandwidth consumption. In step 405, bandwidth and/or power consumption constraints may be determined for data that may be pending delivery from a network node. In step 407, a communication path may be selected for the data pending delivery via one or more of the links and/or nodes based on the power consumption and/or power per bandwidth characterizations of the links and/or nodes. In addition, the communication path may be determined based on the bandwidth and/or power consumption constraints of the data pending delivery. Step 409, is the end of exemplary steps.

In an embodiment of the invention, one or more communication devices of a plurality of communication device, for example, the network device 101, the handheld device 321, the laptop 323, the and/or one or more of the network nodes 320a, 320b, ..., 320i, 330a, 330b, ..., 330g and/or 340b, ..., 340k may comprise one or more processors and/or circuits that may be operable to determine a plurality of routes over which data may be communicated. In this regard, the data may be communicated between a first communication device, for example, the laptop 323, of the plurality of communication devices and a second communication device, for example, the handheld device 321 of the plurality of communication devices.

In accordance with an embodiment of the invention, the plurality of routes may be determined based on availability of bandwidth for the one or more of the plurality of communication devices, for example, the network nodes 320a, 320b, ..., 320i, 330a, 330b, ..., 330g and/or 340b, ..., 340k. In this regard, one or more of the plurality of communication devices may be a network node. Furthermore, one or more of the communication devices that may comprise the network device 101, the handheld device 321, the laptop 323 and/or one or more of the network nodes 320a, 320b, ..., 320i, 330a, 330b, ..., 330g and/or 340b, ..., 340k, may be operable to select from the determined plurality of routes, one or more routes which may require least power consumption for communicating the data between the first communication device and the second communication device. For example the route comprising the links 300a, 300b, 300c, 300d, 3003 and 330f may be selected.

Data may be communicated between the first communication device, for example, the laptop 323 and the second communication device, for example, the handheld device 321 via the selected one or more routes, for example, the route comprising the links 300a, 300b, 300c, 300d, 3003 and 330f. The determined plurality of routes may be ranked based on an amount of power that is required for routing the data via each of the plurality of routes. Data may be routed among the one or more of the plurality communication devices, for example, the network nodes 330a, 320a, 320b, 320c, 320d, 320e and/or 330b based on the ranking. The power consumption may be determined based on a bandwidth associated with the one or more of the plurality communication devices, for example, the network nodes 320a, 320b, ..., 320i, 330a, 330b, ..., 330g and/or 340b, ..., 340k.

In an exemplary embodiment of the invention, the route selection may be based on an indication of availability of power for a power source of the one or more of the plurality communication devices, for example, the network nodes 320a, 320b, ..., 320i, 330a, 330b, ..., 330g and/or 340b, ..., 340k. In this regard, the indication of the availability of power for the power source of the one or more of the plurality communication devices may be communicated among the plurality of communication devices, for example, the nodes 320a, 320b, ..., 320i, 330a, 330b, ..., 330g and/or 340b, ..., 340k. Moreover, the selection of the one or more routes, for example, via the links 300a, 300b, 300c, 300d, 3003 and/or 330f may be based on a current power consumption and/or a history of prior power consumption of the one or more of the plurality communication devices, for example, the network nodes 320a, 320b, ..., 320i, 330a, 330b, ..., 330g and/or 340b, ..., 340k. The selection of the one or more routes which requires least power consumption, for example, via the links 300a, 300b, 300c, 300d, 3003 and/or 330f may be optimized based on the availability of bandwidth.

In a communication system comprising a plurality of network devices, for example, the network device 101, the handheld device 321, the laptop 323 and/or one or more of the network nodes 320a, 320b, ..., 320i, 330a, 330b, ..., 330g and/or 340b, ..., 340k, one or more of the plurality of network devices may be characterized with regard to power consumption. In addition, a route for data communication via one or more of the plurality of network devices may be determined based on the power consumption characterization of the network devices. In this regard, data may be communicated among the one or more of the plurality of network devices based on the determined route. The power consumption may be characterized for a specified bandwidth of the one or more of the plurality of network devices. Furthermore, the one or more of the plurality of network devices may be characterized with regard to current power consumption.

In various embodiments of the invention, power consumption criteria and/or bandwidth criteria for the communication of data may be determined. In this regard, a route for communication of the data, for example, the route comprising the links 300a, 300b, 300c, 300d, 3003 and 330f, may be determined based on power consumption for a specified bandwidth of the one or more of the plurality of network devices. One or more zones of network devices of the one or more of the plurality of network devices, for example, the zone comprising the network nodes 340a, 340b, 340c, 340d and 340k, may be characterized for power consumption and/or power consumption for a specified bandwidth. Accordingly, a route for communicating the data, for example, the route comprising the links 300a, 300b, 300c, 300d, 3003 and 330f, may be determined based on the characterization of the one or more zones of the network devices. One or more of the characterization of power consumption, the determination of a route for data communication and the communication of data may be performed by a single chip and/or a plurality of chips, for example, within the network device 101. Furthermore, one or more of the characterization of power consumption, the determination of a route for data communication and the communication of data may be performed by a single network device and/or a plurality of network devices, for example, the network device 101, the handheld device 321, the laptop 323 and/or one or more of the network nodes 320a, 320b, ..., 320i, 330a, 330b, ..., 330g and/or 340b, ..., 340k.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for power limited switching and/or routing in a network.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising: performing by one or more processors and/or circuits in one or more of a plurality communication devices: determining a plurality of routes over which data may be communicated between a first communication device of said plurality of communication devices and a second communication device of said plurality of communication devices; selecting from said determined plurality of routes, one or more routes which requires least power consumption for communicating said data between said first communication device and said second communication device; communicating data between said first communication device and said second communication device via said selected one or more routes; and selecting said one or more routes based on an indication of availability of power for a power source of said one or more of said plurality communication devices, wherein said indication of said availability of power for said power source of said one or more of said plurality communication devices is communicated among said plurality of communication devices.

2. The method according to claim 1, comprising ranking said determined plurality of routes based on an amount of power that is required for routing said data via each of said plurality of routes.

3. The method according to claim 2, comprising routing data among said one or more of said plurality communication devices based on said ranking.

4. The method according to claim 1, comprising determining said power consumption based on a bandwidth associated with said one or more of said plurality communication devices.

5. The method according to claim 1, wherein said selecting of said one or more routes is based on a current power consumption of said one or more of said plurality communication devices.

6. The method according to claim 1, wherein said selecting of said one or more routes is based on a history of prior power consumption of said one or more of said plurality communication devices.

7. The method according to claim 1, comprising determining said plurality of routes based on availability of bandwidth for said one or more of said plurality of communication devices.

8. The method according to claim 7, comprising optimizing said selection of said one or more routes which requires least power consumption based on said availability of bandwidth.

9. A system for communication, the system comprising: one or more circuits for use in one or more of a plurality of communication devices, wherein said one or more circuits are operable to: determine a plurality of routes over which data may be communicated between a first communication device of said plurality of communication devices and a second communication device of said plurality of communication devices; select from said determined plurality of routes, one or more routes which requires least power consumption for communicating said data between said first communication device and said second communication device, wherein said selecting of said one or more routes is based on a history of prior power consumption of said one or more of said plurality communication devices; and communicate data between said first communication device and said second communication device via said selected one or more routes.

10. The system according to claim 9, wherein said one or more circuits are operable to rank said determined plurality of routes based on an amount of power that is required for routing said data via each of said plurality of routes.

11. The system according to claim 10, wherein said one or more circuits are operable to route data among said one or more of said plurality communication devices based on said ranking.

12. The system according to claim 9, wherein said one or more circuits are operable to determine said power consumption based on a bandwidth associated with said one or more of said plurality communication devices.

13. The system according to claim 9, wherein said one or more circuits are operable to select said one or more routes based on an indication of availability of power for a power source of said one or more of said plurality communication devices.

14. The system according to claim 13, wherein said indication of said availability of power for said power source of said one or more of said plurality communication devices is communicated among said plurality of communication devices.

15. The system according to claim 9, wherein said selecting of said one or more routes is based on a current power consumption of said one or more of said plurality communication devices.

16. The system according to claim 9, wherein said one or more circuits are operable to determine said plurality of routes based on availability of bandwidth for said one or more of said plurality of communication devices.

17. The system according to claim 16, wherein said one or more circuits are operable to optimize said selection of said one or more routes which requires least power consumption based on said availability of bandwidth.

* * * * *